Figure 1:
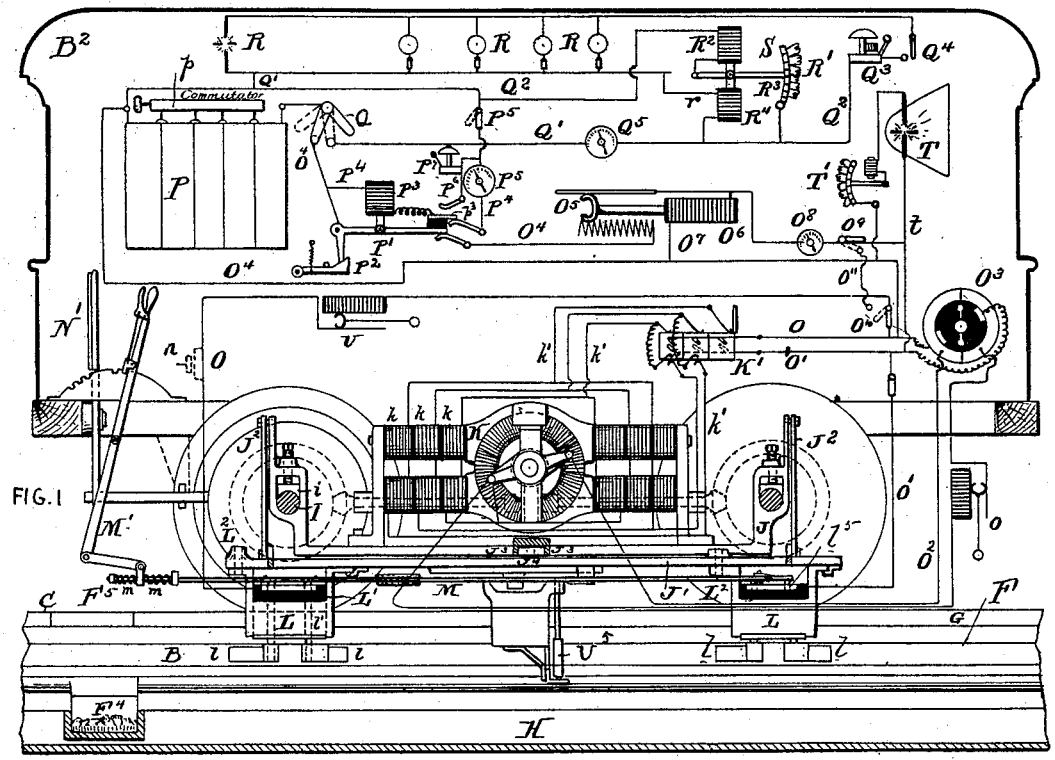

(No Model.)

R. M. HUNTER.
ELECTRIC RAILWAY.

No. 588,528. Patented Aug. 17, 1897.

Attest:
Inventor:

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC RAILWAY.

SPECIFICATION forming part of Letters Patent No. 588,528, dated August 17, 1897.

Original application filed July 19, 1886, Serial No. 208,418. Divided and this application filed July 20, 1895. Serial No. 556,552. (No model.)

*To all whom it may concern:*

Be it known that I, RUDOLPH M. HUNTER, of the city and county of Philadelphia and State of Pennsylvania, have invented an Improvement in Electric Railways, of which the following is a specification.

My invention has reference to the construction and operation of electric railways; and it consists of certain improvements which are fully set forth in the following specification and shown in the accompanying drawings, which form a part thereof.

This application (Case No. 285) is a division of my application, Serial No. 208,418, filed July 19, 1886.

The objects of my invention may be enumerated as follows: to provide an electrically-propelled car receiving electricity from fixed bared conductors extending along the railway with secondary battery or accumulator, whereby the excess of current over that required by the motor may be utilized to charge the battery, the energy of which may be used to regulate the supply of current from the line conductors to the motor, and also to propel the motor independently of or in conjunction with the line-current, or to light the car, or operate the signals on the car.

When used to regulate the motor, the counter electromotive force of the battery is opposed to the supply-current and is regulated by a resistance in the motor-circuit capable of being varied and made to work automatically. If the secondary battery is fully charged and the line-current is too strong for the motor, the resistance is reduced and allows an opposing force in the nature of the counter-current of the battery to act upon the line-current to reduce its power in energizing the motor. If the current in the line is weak, the resistance is increased to reduce the opposition to the line-current, thereby sending more of the line-current through the motor. The battery may be coupled in series or multiple with the motor and line circuits.

When used to propel the motor, the battery is coupled in series with the motor and energizes it, as is well known in electric railways using accumulators. The advantage of combining the two systems lies in the fact that the motor might be propelled by electricity from line conductors on the railway having fixed working conductors and then run onto a section of railway having no supply-conductors, in which latter case the secondary battery or accumulator will be the source of supply of the energizing-current. In this case the current strength could be regulated by resistance in the motor-circuit or otherwise.

When used to light the cars, the energy resulting from the charging of the battery during the daytime may be utilized at night by suitable circuits including arc or incandescent lamps, or both. Such circuits may be supplied with the current-regulating and current-indicating apparatus and suitable switches and cut-outs.

The current from the secondary battery may be supplied to the lamps while the line-current is passing through it. By this construction the accumulator or secondary battery does not have to be removed from the cars for recharging. When used to operate signals, such as conductor-bells and danger-signals, I provide a circuit including such signals and emanating from the accumulator and arrange keys or switches to control the flow of current. In using the secondary battery or accumulator for these purposes I provide suitable automatic devices to cut the accumulator out of line-circuit and sound an alarm when it is fully charged.

I provide the car or vehicle with suitable current-collecting devices adapted to make traveling contact with the line-working conductors extending along the railway, so as to supply current to the motor on the car from a stationary source of electrical energy at any suitable place along the railway.

The foregoing is an enumeration of some of the main features of my invention as set out in this application. There are many details of construction and many advantages which have not been stated, the foregoing being deemed sufficient to elucidate the essential points of the invention.

Figure 2:
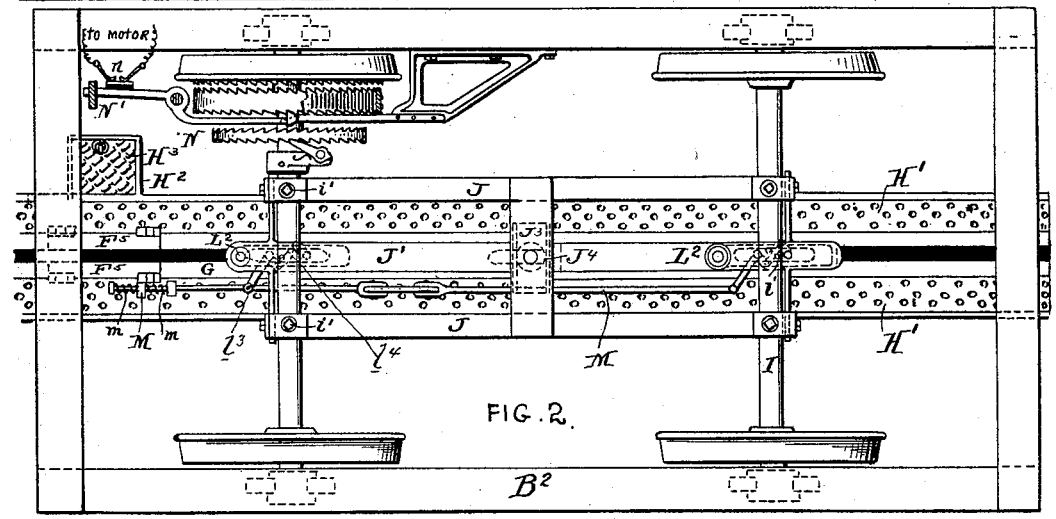

In the drawings, Figure 1 is a sectional elevation on line $x\ x$ of an electric car or motor and shows the arrangement of the various circuits, &c., on the car; and Fig. 2 is a plan view of the truck of same with the motor and all the upper portion removed.

B² represents the car-body, which may be supported upon springs in the usual manner. The wheels are secured to axles I, which are suitably journaled in axle-boxes. Supported upon these axles are the two frames J J, made vertically adjustable thereon by adjustable guides $i'$. The motor K is supported upon these frames and is geared to the axles I in any suitable manner, that method indicated in dotted lines being similar to the construction shown in my application filed July 14, 1885, Serial No. 171,625. The collector-frame J' is swung upon suspended parallel links J², pivoted to the frame J, whereby the collector-frame may swing laterally, but always remain horizontal. These links being secured to the frames J the vertical adjustment of said frames will also adjust the collector devices vertically in the slot C of the conduit H, contained therein. The frame J' has guides J³ arranged transversely across its middle, between which a stationary roller J⁴ is received, the said roller being supported by the frame J'. This roller and guides prevent any longitudinal movement of the collector-frame, but do not in the least interfere with the lateral movement, which is necessary for inequalities in the position of the slot or conductors. Located below each axle and hinged at their ends to the collector-frame J' by vertical pins L² are the collector-plates L, to which the collectors $l$ are secured and from which they are insulated. Their upper portions are notched and the body portions filled with insulating material L', through which vertical rods $l'$ pass to operate the collectors $l$. The upper parts of these rods $l'$ pass above the connecting and insulated plate $l^5$ and terminate in cranks $l^3$, which are connected by links $l^4$. The object of this construction is that when one collector is turned to make contact with the working conductor the other collector of the same collector-plate is turned out of contact or in a longitudinal line and points in the direction of travel of the vehicle. By this means the collectors trail, and a different pair of collectors work when running backward than when running forward. The collectors of a plate may always work on the same conductors or may work upon opposite conductors, as shown, in which case the adjustment of the collectors also causes a reversal of current through the motor. The collectors on the two collector-plates are simultaneously operated by the insulated connecting-rod M, the end of which is connected by a slip-joint with the lever M', but is caused to move with the movements of said lever by the springs $m$, and these springs cause the collectors to press upon the working conductors with more or less elastic pressure.

It is immaterial what the specific shape or construction of the parts may be, as it is evident that they may be modified in various ways to suit the various conditions.

In this application I do not claim the specific construction of the current-collectors, as they form subject-matter of my application, of which this is a division.

Located between the collector-plates L is the brush U⁵ for cleaning the conduit-walls and sweeping the refuse into the wells F⁴ of the conduit H. It is evident that the particular location of this brush and its appendages may be varied. It is also evident that the brush should be so constructed that parts brushing the conductors of opposite polarity may be insulated from each other to prevent short-circuiting of the currents.

O and O' are the two main conductors on the car, which receive the current from the collectors and supply it to the motor, and hence may be considered the motor-circuit. This circuit is provided with a resistance-changer U, located therein.

O² is an armature-circuit and may be provided with a resistance-changer $o$ and have its current reversed by reversing-switch O³ of any suitable construction.

The motor K is shown as having its field-magnets divided into sections $k$, which may be coupled up in series or multiple by the commutator-switch K' of well-known construction, which connects the conductors O O' with the motor-conductors $k'$, connecting with the coil-sections $k$ of the motor-magnets.

The current passes from one of the collectors by circuit O, through resistance-changer U, thence to the field-magnets by a commutating device K', returning by circuit O' to the other collector. The armature is not in series relation with the field-coils, but is included in a circuit O², leading from the motor-circuits O O', and includes a current-reversing switch O³ and a resistance-changer $o$.

The car-starter shown in Figs. 1 and 2 is designed to store its power slowly when the car is running at normal speed or just before stopping, in which latter case it would act as a brake to bring the car to rest. The power so stored may be utilized to give the first motion to the car upon starting and also to the motor. The motor-circuit may be completed by the movement of the lever N', which applies the mechanical power to the car-starter, which is usually a spring. This circuit-closing device is shown at $n$, and may include the circuit O or O'. The essential feature of a contrivance of this nature consists in the application of a mechanical power to start the car and afterward relying wholly upon the electrical propulsion thereof.

The advantage of employing mechanically-stored power to start the car is evident, as with it the motor might be made much smaller and cheaper than it otherwise would have to be to overcome the inertia of the car at rest. Furthermore, it is often difficult to start a heavily-loaded car upon an upgrade and particularly so with shunt-wound motors. These defects will be in a large measure overcome by employing a mechanical car-starter in connection with the electric motor.

So far my invention has been described to elucidate the construction and principles involved upon the system and electrically-propelled vehicle receiving current from the fixed bared working conductors, be they in conduits or upon the surface or otherwise arranged. I now come to that portion of the invention which covers the application of accumulators or storage batteries as a means of regulating the motor, as a means of propulsion of the same, and as a means of lighting the car and operating the signals thereon.

P is the secondary battery or accumulator of as many cells as desired. These cells are connected by circuit $O^4$ with the motor-circuits O and O' and by switches $O^9$ and $O^{10}$ and conductor $O^{11}$. The said cells may be coupled up in multiple-arc or series connection with the motor for operating it or providing the necessary current for other purposes on the car. The incoming current from the line conductors is caused to either all flow through the accumulator (for series connection) or part through the motor and part through the accumulator, (for multiple-arc connection.) In the first instance the counter electromotive force of the accumulator opposes the line-current, and by varying a resistance in the circuit the power of the line may be varied to suit the requirements. If the battery or accumulator and motor are coupled in multiple arc, as shown in Fig. 1, it will be seen that the line-current divides, part passing through the motor and part through the accumulator. That portion of the current which passes through the accumulator induces stored energy therein and also produces by the change in the accumulator a counter electromotive force which proportionally opposes the line-current. By reducing the resistance $O^5$ it is evident that more line-current will pass through the accumulator, reducing the deadening or opposing effect of the counter electromotive force; but as the counter electromotive force increases it will more or less annul the power of the line-current, and if sufficiently strong may be used to deaden or oppose to the desired degree the power of the line-current and thereby be used as a regulating means to control the motor. By reducing the resistance $O^5$ the counter electromotive force of current of the accumulator, if strong, will increase its effects, and vice versa, and if the resistance $U^6$ in the motor-circuit be used to reduce the power of the line-circuit the regulation may be still more easily accomplished. The resistance-changer $O^5$ may be made to work automatically by a helix $O^6$ and circuit $O^7$ short-circuiting the secondary battery or accumulator. Part of the line-current will traverse the helix $O^6$ and return to the opposite conductor, and this current will be proportional to the current passing through the motor. If it be too strong, the resistances $O^5$ are partly cut out, and the counter-current from the accumulator having less resistance to overcome passes down the circuit and opposes the line to a greater degree. A suitable commutator $p$ may be used to couple up the cells of the accumulator in any way desired to vary the electromotive force of the accumulator and may be used in place of resistance-changer $O^5$.

$O^8$ is an indicator to show the strength or direction of the current, or both. The commutator $p$ is similar to the well-known devices for coupling up batteries in different connections for strength of current, and by it the cells may be coupled up in series, multiple arc, or both combined, and the indicators $P^5$ and $O^8$ will show the strength of current passing.

The accumulator may be used to propel the car when running upon tracks having no line working conductors and branching from the main line, or it may be used to assist the line-current when the latter is weak. When the accumulator is used as a source of electrical motive force, the strength of the current would be regulated either by the commutator $p$ or variable resistance, or both.

To automatically indicate when the accumulator is fully charged, I provide a short circuit $P^4$, including an electromagnet $P^3$, adapted to operate armature-lever $P'$, which opens the circuit $O^4$ and closes an alarm-circuit $P^6$, having an alarm $P^7$ included therein.

$P^5$ is a current-indicator to show the strength of counter-current.

The magnet $P^3$ is wound with high resistance and so that it will raise the weight of the armature-switch only when the full electromotive force of the batteries or accumulators is reached.

$p^3$ is a switch-contact to break the circuits $P^4$ and $P^6$. When the lever $P'$ is raised by magnet $P^3$, the lock $P^2$ locks it in position, and it will remain so unless unlocked. The object here is to break the charging-circuit when the accumulator is fully charged and retain it so until it is coupled up for lighting the cars or energizing the motor when the car is on the track unprovided with working conductors, unless it is to be used for regulating the power of the motor.

R are the electric lamps, of the arc or incandescent type, and are in a circuit O', which may be coupled with the accumulators by a switch Q.

$Q^5$ is a current-indicator. The lamp-circuit may be provided with a resistance-changer S, which may be automatic or hand-regulating. The regulator shown consists of resistances R', cut in or out of the light-circuit by a lever $R^3$, which is operated on the differential principle by a low-resistance magnet $R^2$ in the lighting-circuit and high-resistance magnet $R^4$ in a shunt-circuit $r$. The particular form of regulator is immaterial.

Q³ is a signal and is in an open circuit Q², receiving current from the accumulator, and its circuit may be closed to operate the signal by a circuit-closer or switch Q⁴. By this system I am enabled to have extremely steady light without the least danger from excessive currents or temporary derangements in the motor-circuits, and yet receive the energy from the same source as the motor and never require to remove the accumulator for recharging.

During the daytime the accumulator may be charged while propelling the car in its ordinary duty, and in the evening or night the charged accumulator may be connected to the lighting-circuit. Even while the accumulator is being charged or when being used as a regulator the lights and signals may be operated by it as a source of electrical energy.

T represents a headlight of arc type in a circuit $t$ and receiving current from the said circuit, which is coupled with both the line and accumulator circuits and provided with a regulator T'. By this means the lighting-current may be maintained uniform.

The apparatus here shown is capable of much modification without in the least departing from the spirit of the invention. The accumulator may be coupled up in many ways, but such details are immaterial.

I do not limit myself to the details of construction herein set out.

Having now described my invention, what I claim as new, and desire to secure by Letters Patent, is—

1. The combination of a car having a body supported on the axles by springs, field-magnets having connected therewith journals sleeved upon the axle and supported independently of the car-body, an armature and shaft mechanically connected with the axle so as to rotate with a speed commensurate with that of the axle, a secondary battery carried upon the car-body, electric circuits connecting the field-magnets and armature with the batteries, a lighting-circuit on the car-body, switches for connecting the lighting-circuit with the electric circuits leading to the armature and field-magnets or with the secondary battery, and means for varying the electromotive force of the battery.

2. In an electric railway, the combination of a stationary source of electric energy, line working conductors extending along the line of railway, a car, an electric motor to propel the car, suitable current-collecting devices moving with the car for making electrical contact with the working conductors, a secondary battery on the car, switch devices connecting the battery that it shall operate in series or multiple with the motor relatively to the current flowing through the current-collecting devices, and a speed-regulator for the motor to control the current flowing therein independently of the current flowing from the line through the battery when said battery and motor are connected in parallel.

3. In an electric railway, the combination of a stationary source of electric energy, line working conductors extending along the line of railway, a car, an electric motor to propel the car, suitable current-collecting devices moving with the car for making electrical contact with the working conductors, a secondary battery on the car, switch devices connecting the battery that it shall operate in series or multiple with the motor relatively to the current flowing through the current-collecting devices, means for varying the potential of the secondary battery, and a speed-regulator for the motor to control the current flowing therein independently of the current flowing from the line through the battery when said battery and motor are connected in parallel.

4. In an electric railway, the combination of a stationary source of electric energy, line working conductors extending along the line of railway, a car, an electric motor to propel the car, suitable current-collecting devices moving with the car for making electrical contact with the working conductors, a secondary battery on the car, switch devices connecting the battery that it shall operate in series or multiple with the motor relatively to the current flowing through the current-collecting devices, means for coupling the cells of the secondary battery in series or parallel, and a speed-regulator for the motor to control the current flowing therein independently of the current flowing from the line through the battery when said battery and motor are connected in parallel and in series with the battery when said battery and motor are connected in series.

5. In an electric railway, line conductors extending along the path of the railway for supplying current of constant potential to a traveling car, in combination with a car, an electric motor to propel the car, secondary batteries moving with the car, potential-varying devices for the secondary battery, circuits for coupling the motor and battery in parallel connection with the line conductors, and a speed-regulator to control the speed of the motor interposed between the motor and the connection of the battery with the line.

6. In an electric railway, an electrically-propelled vehicle, a stationary source of electric supply, a line conductor along the railway, a motor carried by the vehicle to propel it and receiving current from the conductors, a regulator to control the speed of the motor and thereby the travel of the vehicle, an electric-light circuit shunted around the motor receiving electricity from the same source, an electric lamp in said shunt-circuit, an automatic regulator to vary the current flowing over said shunt-circuit, a secondary battery, circuits and switches to couple up the battery with the line conductors or said light-circuit.

7. In an electric railway, the combination of a stationary source of electric energy, working conductors extending along the track and receiving current from the stationary source, an electrically-propelled vehicle, an electric motor to propel the vehicle, a secondary battery upon the vehicle, circuits connecting the secondary battery and motor with the working conductors, a regulator for controlling the current passing through the motor independent of the battery, and switches for coupling the battery with the electric motor and cutting out the electrical connection with the working conductors outside of the motor-regulator.

8. In an electric railway, the combination of a stationary source of electric energy, working conductors extending along the track and receiving current from the stationary source, an electrically-propelled vehicle, an electric motor to propel the vehicle, a secondary battery upon the vehicle, circuits connecting the secondary battery and motor with the working conductors, a regulator for controlling the current passing through the motor independent of the battery, switches for coupling the battery with the electric motor and cutting out the electrical connection with the working conductors outside of the motor-regulator, an electric-light circuit on the vehicle, and a switch to control the current flowing from the secondary battery to the lighting-circuit.

9. In an electric railway, the combination of a stationary source of electric supply, working conductors arranged along the track and receiving electricity from said source, an electrically-propelled vehicle receiving electric current from said conductors, a secondary battery on said vehicle, a circuit connecting it with said conductors, an electric-light circuit including said secondary battery, a switch to break said electric-light circuit, a regulator for the motor to control its speed independent of the strength of the battery, and a switch to break the electric connection between the battery and working conductors.

10. In an electric railway, the combination of a stationary source of electric supply, working conductors arranged along the track and receiving electricity from said source, an electrically-propelled vehicle receiving electric current from said conductors, a secondary battery on said vehicle in parallel with the motor by a circuit connecting it with said conductors, and an automatic circuit-breaker to cut the secondary battery out of the line or working-conductor circuit when fully charged without disturbing the connection of the motor with the line-circuits.

11. In an electric railway, the combination of a stationary source of electric supply, working conductors arranged along the track and receiving electricity from said source, an electrically-propelled vehicle receiving electric current from said conductors, a secondary battery on said vehicle, a circuit connecting it with said conductors, and an automatic circuit-breaker controlled by the counter electromotive force of the secondary battery to cut the secondary battery out of the line or working-conductor circuit when sufficiently charged without affecting the connection of the line with the motor.

12. In an electric railway, the combination of a stationary source of electric supply, working conductors arranged along the track and receiving electricity from said source, an electrically-propelled vehicle receiving electric current from said conductors, a secondary battery on said vehicle, a circuit connecting it with said conductors, an automatic circuit-breaker controlled by the counter electromotive force of the scondary battery to cut the secondary battery out of the line or working-conductor circuit when sufficiently charged without affecting the connection of the line with the motor, and a lock to keep said secondary battery cut out.

13. In an electric railway, the combination of a stationary source of electric supply, working conductors arranged along the track and receiving electricity from said source, an electrically-propelled vehicle receiving electric current from said conductors, a secondary battery on said vehicle, a circuit connecting it with said conductors, an automatic circuit-breaker to cut the secondary battery out of the line or working-conductor circuit, and an alarm to indicate when said secondary battery is cut out.

14. In an electric railway, the combination of a stationary source of electric supply, working conductors arranged along the track and receiving electricity from said source, an electrically-propelled vehicle receiving electric current from said conductors, a secondary battery on said vehicle, a circuit connecting it with said conductors, and an electrically-actuated resistance-changer to vary the resistance to the current in the circuit between the working conductors and secondary battery.

15. In an electric railway, the combination of a stationary source of electric supply, working conductors arranged along the track and receiving electricity from said source, an electrically-propelled vehicle receiving electric current from said conductors, a secondary battery on said vehicle, a circuit connecting it with said conductors, switches to cut the motor out of the line-circuit with the working conductors without interfering with the connection of the working conductors with the secondary battery, and a switch to reverse the current in the armature.

16. The combination of a stationary line working conductor extending along a railway, a vehicle, a motor to propel the vehicle, a secondary battery on the vehicle, a collector structure carried by the vehicle and laterally movable thereon and making a traveling contact with the conductor, circuits between the collector motor and battery, switches for coupling the collector with the motor or battery separately and independently, and a regulator for controlling and varying the current passing through the motor.

17. In an electric railway, the combination of a stationary source of electric supply, working conductors arranged along the track and receiving electricity from said source, an electrically-propelled vehicle receiving electric current from said conductors, a secondary battery on said vehicle, a circuit connecting it with said conductors, a regulator for varying the current passing through the motor, and switch devices independent of the regulator to couple up said secondary battery in series or multiple-arc connection with the motor.

18. The combination of a car having a body supported on the axles by springs, field-magnets having connected therewith journals sleeved upon the axle and supported independently of the car-body, an armature and shaft mechanically connected with the axle so as to rotate with a speed commensurate with that of the axle, a secondary battery carried upon the car-body, electric circuits connecting the field-magnets and armature with the batteries, a lighting-circuit on the car-body, switches for connecting the lighting-circuit with the electric circuits leading to the armature and field-magnets or with the secondary battery, means for varying the electromotive force of the battery, and an automatic switch for cutting the battery out of circuit when fully charged.

19. In an electric railway, the combination of line working conductors, with a traveling car having an electric motor receiving electricity therefrom, a secondary battery or accumulator carried by said car, and connecting-circuits for coupling up the motor and secondary battery in multiple with respect to the working conductors, and a resistance-changer common to both the secondary-battery circuit and line-circuit.

20. The herein-described method of propelling and lighting cars from a fixed source of electrical energy, which consists in supplying electricity to the motor on a traveling vehicle from fixed working conductors with which the motor is in connection, storing the excess of current in a secondary battery or accumulator carried by the vehicle and supplying electricity to the electric lamps carried by the car from said secondary battery, and reducing the lighting-circuit resistance as the power of the secondary battery becomes reduced.

21. The combination of a generator giving a normal current, a number of main translating devices in multiple arc from said generator, a regulating-magnet in multiple arc with said devices, and additional compensating translating devices controlled by said magnet and adapted to be connected with the main line, so as to offer greater or less resistance according as more or less of the main translating devices are in circuit.

22. The combination of a car having a body supported on springs, field-magnets and armature having their weight carried by the axles independent of the car-body, secondary batteries carried on the car-body, a lighting-circuit on the car, and switches for connecting the lighting-circuit with the battery or armature.

23. The combination of line conductors leading from a stationary source of electrical energy, with an electric motor connected to said conductors and receiving current therefrom, a regulator for generating a variable counter electromotive force independent of the motor adapted to oppose the line-current adjacent to the motor to vary the current flowing through the motor and thereby its speed, means to control the current in the field and armature relatively to each other and means to reverse the current in the armature of the motor relatively to its field.

24. The combination of line conductors leading from a stationary source of electrical energy, with a motor receiving current therefrom having its field-magnet in shunt relation to its armature, a counter-electromotive-force regulator independent of the motor for controlling the speed of the motor arranged in circuit with the line and in parallel relation to the field-magnets of the motor and a resistance-changer in the armature-circuit to control the current in the armature independently of the field.

25. The combination of line conductors leading from a stationary source of electrical energy, with a motor receiving current therefrom having its field-magnet in shunt relation to its armature, a counter-electromotive-force regulator independent of the motor for controlling the speed of the motor arranged in circuit with the line and in parallel relation to the field-magnets of the motor, and means to vary the strength of the field-magnets of the motor independently of the current flowing through the armature.

26. The combination of a car having a body supported on springs, field-magnets and armature having their weight carried by the axles independent of the car-body, secondary batteries carried on the car-body, a lighting-circuit on the car, switches for connecting the lighting-circuit with the battery or armature, and means for varying the field strength of the field-magnets.

27. The combination of a car, an electric motor to propel the car, a storage battery on the car comprising a number of cells, a motor-circuit including the storage battery and motor, means for coupling up the cells of the battery in series or multiple, and a variable resistance interposed in series with battery and motor.

28. The combination of a car, an electric motor to propel the car, having independent coils upon its field-magnets, a storage battery on the car comprising a number of cells, a motor-circuit including the storage battery and motor, means for coupling up the cells of the battery in series or multiple, and means for connecting the coils of the field-magnets of the motor in series or parallel.

29. The combination of a car, an electric motor to propel the car, having independent coils upon its field-magnets, a storage battery on the car comprising a number of cells, a motor-circuit including the storage battery and motor, means for coupling up the cells of the battery in series or multiple, means for connecting the coils of the field-magnets of the motor in series or parallel, and a reversing-switch for reversing the current in the armature.

30. In an electric railway, the combination of working conductors extending along the railway leading from a stationary source of electric energy, a car, a motor to propel the car, a secondary battery on the car, circuits on the car connecting the working conductors motor and secondary battery, and a suitable controller interposed between the motor on the one part and both the secondary battery and working conductors on the other part.

31. In an electric railway, the combination of working conductors extending along the railway leading from a stationary source of electric energy, a car, a motor to propel the car, a secondary battery on the car, circuits on the car connecting the working conductors motor and secondary battery, switch devices for varying the electromotive force of the battery, and a suitable controller independent of the switch devices interposed between the motor on the one part and both the secondary battery and working conductors on the other part.

32. In an electric railway, the combination of working conductors extending along the railway leading from a stationary source of electric energy, a car, a motor to propel the car, a secondary battery on the car, circuits on the car connecting the working conductors motor and secondary battery, switch devices for varying the electromotive force of the battery, a suitable controller independent of the switch devices interposed between the motor on the one part and both the secondary batteries and working conductors on the other part, and a reversing-switch independent of the controller and switch devices for reversing the motor.

33. The herein-described method of operating an electric railway which consists in maintaining a current of constant potential in line-circuits extending along the railway, supplying current therefrom to an electric motor and secondary batteries on the car, changing the counter electromotive force of the secondary batteries to a higher potential approximately equal to that of the line-circuit, and regulating the speed of the motor by controlling the current delivered to the moter while maintaining the said higher potential of the batteries.

In testimony of which invention I have hereunto set my hand.

R. M. HUNTER.

Witnesses:
ERNEST HOWARD HUNTER,
C. H. NEWCOMB.